United States Patent Office 2,839,653
Patented June 17, 1958

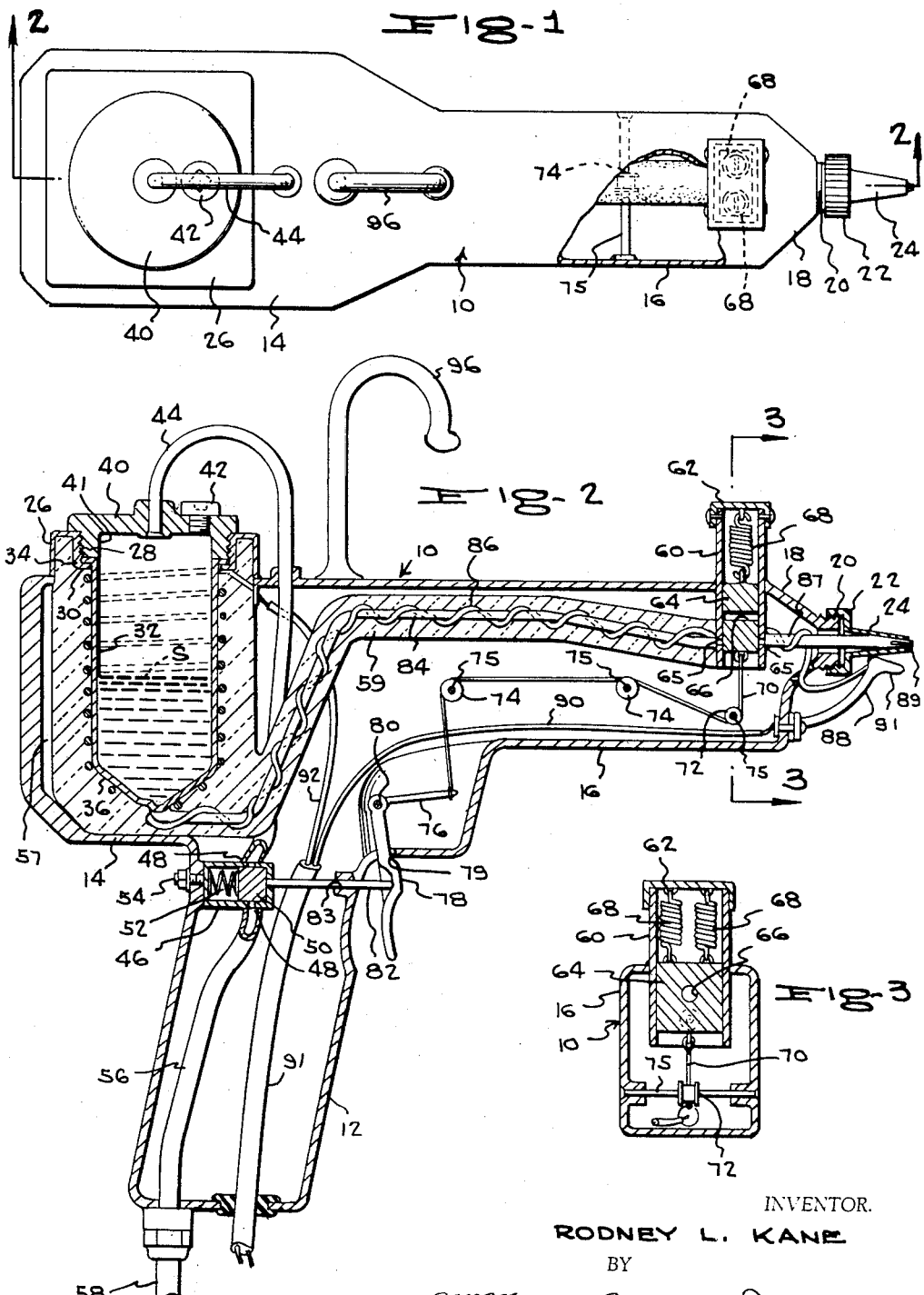

2,839,653

EJECTOR TYPE, ELECTRICAL SOLDERING GUN

Rodney L. Kane, Chicago, Ill.

Application August 16, 1957, Serial No. 678,494

5 Claims. (Cl. 219—27)

This invention relates to an electrically heated soldering gun of the type wherein the solder is injected from the tip or muzzle of the gun against the work so as to be directed against the work in a fine stream or jet.

Among important objects of the invention are the following:

To provide a gun as stated which will be particularly easy to handle;

To provide increased accuracy in the use of the gun;

To permit a wide range of adjustments as to the velocity and quantity of the ejected solder;

To provide an improved means for using chunk solder and for reducing the same to a molten state;

To provide, in a tool of the type stated, means for ejecting the molten solder by means of fluid pressure, such as compressed air;

To cause the pressure fluid to be directed against the solder by controlled operation of a valve, with said valve being opened at the same time the outlet valve of the solder ejection passage is opened, the two valves also being closed simultaneously, responsive to squeezing and release, respectively, of a single trigger; and To provide, in the electrical resistance means used for heating the solder and keeping the same hot, an arrangement such that the resistance element will extend the full length of the soldering passage, and will include, at the tip of the passage, a nose-like projection of electrically conductive material having a high electrical resistance, whereby said projection may be used for flowing the solder about the work, and may also be used, if desired, for melting or cutting hardened solder or similar material.

Other objects will appear from the following description, the claims appended thereto, and from the annexed drawing, in which like reference characters designate like parts throughout the several views, and wherein:

Figure 1 is a top plan view in which a portion has been shown in section;

Figure 2 is a longitudinal section on line 2—2 of Figure 1; and

Figure 3 is a transverse section on line 3—3 of Figure 2.

The soldering gun 10 constituting the present invention includes a hollow, pistol-grip handle 12 of metal material or any other suitable material, integral at its upper end with the underside of a wide, completely hollow casing 14 which is in communication with the interior of the handle 12, and which merges, at its front end, into the inner end of an elongated, forwardly projecting barrel 16, with which said casing is also in communication.

Barrel 16 at its forward end has a forwardly tapering or frusto-conical front end wall 18, integral at its forward extremity with a forwardly projecting, small-diameter, externally threaded annulus 20, on which is threaded, for adjustment longitudinally of the barrel, the internally threaded, cup-shaped base 22 of an elongated, forwardly tapering, nozzle-adjusting sleeve 24.

Welded or otherwise fixedly secured to the top wall of casing 14, and extending about a rectangular top opening of the casing, is a peripherally, dependingly flanged cover plate 26 centrally formed with a large, circular opening bounded by an internally threaded, annular portion 28 terminating at its lower end in an integral, inwardly directed lip 30.

An elongated, cylindrical solder cup or reservoir 32 is adapted to receive chunks or lengths of solid solder that are to be reduced to the form of molten solder S. Reservoir 32 at its upper end has an outwardly directed, circumferential lip 34 supported upon the lip 30, and at its lower end has a downwardly tapering bottom wall 36. Spirally coiled about the reservoir, for the full length thereof, is an electrical resistance wire or element 38.

A cap 40 has an externally threaded, depending, marginal flange 41 threadedly engaged with portion 28, the lower end of flange 41 bearing against lip 34 to firmly engage the reservoir in casing 14. In its marginal area cap 40 has a threaded opening receiving a threaded filler plug 42, which may have a recess for receiving an Allen wrench or the like, with solder being insertable in the reservoir or cup through the filler opening.

Fixedly engaged in a centrally apertured boss of cap 40 is one end of a pressure fluid supply tube 44, said end opening into the upper end of cup 32. Tube 44 arches upwardly from cap 40, and then extends into casing 14, forwardly of cup 32. Tube 44 is then secured sealably, within handle 12, to one side of a valve casing 46 having diametrically opposed inlet and outlet ports 48, one of which is in communication with tube 44.

A valve block or element 50 is axially reciprocable within casing 46, and is spring-biased by a compression coil spring 52 to a normally closed position preventing flow of pressure fluid, such as compressed air, between the ports 48.

Fixedly mounting the valve casing 46 within the handle 12 is a threaded extension 54 of the valve casing, extending through an opening of handle 12 and receiving a nut exteriorly of the handle.

A length of tubing 56 is extended within handle 12, being connected at one end about the inlet 48 of the valve casing. Tubing 56 extends to the lower end of the handle, where it is provided with a fitting that permits the same to be connected to a compressed air line 58 extending from a suitable air compressor, not shown, which air compressor preferably would be equipped with regulator means for adjusting the amount of pressure with which air is directed through the compressed air conduit constituting the tubes, 56, 44. In a typical working arrangement, approximately five pounds pressure would be supplied.

The cup 32 is centrally embedded, together with its surrounding resistance element 38, in a block 57 of heat insulation. Preferably, asbestos or other fire-proof or fire-resistant material is used. Said block is integral with an elongated, angularly shaped length of insulation 59 that projects forwardly within the barrel 16 and is secured at its forward end to the inner end of a casing 60 of a solder flow control valve. Casing 60 extends transversely of barrel 16, projecting at its other end outwardly from the barrel, said other end being provided with a cap 62.

A valve block 64 shiftable longitudinally of casing 60 is of non-circular cross section, as is the casing, so that a transverse passage 66 of the block 64 will be located to permit flow between inlet and outlet ports 64 of the casing 60, whenever the block is in a lower, valve-opening position.

A pair of contractile springs 68 (Figure 3) are connected between cap 62 and block 64, and normally bias block 64 to its closed position shown in Figures 2 and 3.

Connected to the inner end of the block, that is, the end opposite that to which springs 68 are connected, is a fine wire cable 70, trained within barrel 16 about pulleys 72, 74, 74 that are spaced longitudinally of the barrel and are rotated upon pins 75 (see Figure 1), which pins are engaged at their ends in the opposite side walls of the barrel.

Cable 70 at its other end is connected to the forward end of a radial arm 76 integral with the inner end of a trigger 78 that pivots on a cross pin 80 extending between the side walls of handle 12. The distal end of trigger 78 is disposed exteriorly of the handle, projecting through a slot 79 of the handle.

Arm 76 extends radially from the shaft 80 on which the trigger 78 pivots. Trigger 78, exteriorly of handle 12, has a rearwardly facing indentation or recess, receiving the forward end of a plunger or stem 82 axially shiftable in an opening 83 of handle 12 and secured to block 50.

When trigger 78 is squeezed or pressed, that is, swung to the left in Figure 2, stem 82 is depressed in handle 12, biasing block 50 against the restraint of spring 52 to a position clear of ports 48, so that the compressed air will flow through the conduit into reservoir 32.

At the same time, cable 70 will be pulled, lowering block 64 in Figure 2 to register passage 66 with ports 65. The molten solder will now be free to flow through an elongated tube 84 embedded in insulation 59, said tube 84 being in communication at one end with the lower extremity of solder 36. Coiled about tube 84 is an electrical resistance wire 86 spiralling about tube 84 within insulation 59 through the full length of tube 84. Tube 84 at its forward end is fixedly connected to casing 60 in communication with one opening 65.

Fixedly secured to casing 60, at the opposite side thereof, in communication with the other opening 65, is a straight nozzle 87, having at its forward end angularly spaced, longitudinally extending slits 89, resiliently flexible into selected convergent relationships responsive to axial movement of sleeve 24, through which the nozzle projects. In other words, by shifting sleeve 24 to the left in Figure 2, the spring tongues defined between slits 89 are shifted into convergent relation, to reduce the outlet of the nozzle 87 and thereby provide a fine jet of high velocity. By shifting sleeve 24 to the right in Figure 2, the outlet of the nozzle is increased in size, thickening the stream and reducing the velocity thereof somewhat.

A forwardly projecting nose 91 is disposed adjacent the outlet of nozzle 87, and is integrally formed upon an arm 88 that is of an electrically conductive material of high resistance, said arm 88 being secured electrically, adjacent nose 91, to the resistance wire 86, the arm 88 at its other end being electrically connected to a lead 90 of an electrical conductor 91, the other lead 92 of which is connected at 94 to one end of the spiralling resistance element 38. The other end of resistance element 38 is connected to the inner end of the wire 86.

Therefore, by operation of a suitable switch, not shown, controlling flow of electrical current through the conductor 91 from a source of electricity, current flows through lead 92, resistance 38, resistance 86, nose 91, arm 88, and lead 90 back to the source of electricity. Not only does this heat the solder within the pot or reservoir 32, but also, heat is applied to the conduit 84 over the full length thereof. Still further, heat is applied to the nozzle 87 itself, since the resistance 86 is looped thereabout. The nose 91 is also kept hot, and heats the tip of the nozzle, while at the same time providing a hot surface that can be used to melt solder and can be used for cutting purposes.

A hook 96 is secured to the top surface of the barrel, for the purpose of hanging the device on a suitable nail or other support when not in use.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. An electrical soldering gun comprising a body including a handle, a casing, and a barrel all connected in communication with each other; a solder pot within the casing; a nozzle projecting forwardly from the barrel; a conduit for molten solder extending from the pot to the nozzle; a pressure fluid conduit extending into the pot for creating pressure therein to force solder from the pot through the solder conduit and nozzle; valve means for controlling flow through the respective conduits; a valve operator mounted on the body and connected to the respective valve means; and electrical resistance means extending in proximity to the pot for heating solder confined therein, said electrical resistance means extending also in proximity to the solder conduit and nozzle for maintaining in molten condition solder flowing through the solder conduit and nozzle, the electrical resistance comprising a resistance wire coiled spirally about the pot, and continuing in spiralling fashion along the length of the solder conduit and nozzle, said electrical resistance means further including a nose-like projection disposed exteriorly of and mounted upon the barrel, adjacent the nozzle, in laterally spaced relation to the nozzle so as to be applicable to solidified solder for melting the same, said nose-like projection being connected in circuit with the spiralling resistance element.

2. An electrical soldering gun comprising a body including a handle, a casing, and a barrel all connected in communication with each other; a solder pot within the casing; a nozzle projecting forwardly from the barrel; a conduit for molten solder extending from the pot to the nozzle; a pressure fluid conduit extending into the pot for creating pressure therein to force solder from the pot through the solder conduit and nozzle; valve means for controlling flow through the respective conduits; a valve operator mounted on the body and connected to the respective valve means, comprising a trigger pivotally mounted upon the body adjacent the handle, a stem extending from the trigger to one of said valve means for operating said one valve means responsive to squeezing of the trigger, and a flexible element extending within the barrel to the other valve means and adapted for operating said other valve means on said squeezing of the trigger, whereby to operate both valve means simultaneously; and electrical resistance means extending in proximity to the pot for heating solder confined therein.

3. An electrical soldering gun comprising a body including a handle, a casing, and a barrel all connected in communication with each other; a solder pot within the casing; a nozzle projecting forwardly from the barrel; a conduit for molten solder extending from the pot to the nozzle; a pressure fluid conduit extending into the pot for creating pressure therein to force solder from the pot through the solder conduit and nozzle; valve means for controlling flow through the respective conduits; a valve operator mounted on the body and connected to the respective valve means, comprising a trigger pivotally mounted upon the body adjacent the handle, a stem extending from the trigger to one of said valve means for operating said one valve means responsive to squeezing of the trigger, and a flexible element extending within the barrel to the other valve means and adapted for operating said other valve means on said squeezing of the trigger, whereby to operate both valve means simultaneously, the respective valve means including valve cylinders each of which has diametrically opposite ports communicating with the respective conduits, for flow of pressure fluid and solder, respectively, through the cylinders, and valve blocks spring biased within the cylinders to positions normally preventing flow between the ports of the cylinders, said stem and flexible elements of the valve operator being connected to the respective blocks for shifting the blocks against the restraint of the spring bias thereof to positions permitting flow between the ports of each cylinder.

4. An electrical soldering gun comprising a body including a handle, a casing, and a barrel all connected in communication with each other; a solder pot within the casing; a nozzle projecting forwardly from the barrel; a conduit for molten solder extending from the pot to the nozzle; a pressure fluid conduit extending into the pot for creating pressure therein to force solder from the pot through the solder conduit and nozzle; valve means for controlling flow through the respective conduits; a valve operator mounted on the body and connected to the respective valve means; electrical resistance means extending in proximity to the pot for heating solder confined therein; and means mounted upon the barrel and extending about the nozzle, adapted for adjusting the size of the nozzle outlet.

5. An electrical soldering gun comprising a body including a handle, a casing, and a barrel all connected in communication with each other; a solder pot within the casing; a nozzle projecting forwardly from the barrel; a conduit for molten solder extending from the pot to the nozzle; a pressure fluid conduit extending into the pot for creating pressure therein to force solder from the pot through the solder conduit and nozzle; valve means for controlling flow through the respective conduits; a valve operator mounted on the body and connected to the respective valve means; electrical resistance means extending in proximity to the pot for heating solder confined therein; and means mounted upon the barrel and extending about the nozzle, adapted for adjusting the size of the nozzle outlet, said last named means comprising a tapered sleeve adjustable axially of the barrel, the nozzle having at its outlet end a plurality of spring tongues about which the smaller end of the sleeve extends, said tongues being shiftable into selected convergent relationships responsive to axial adjustment of the sleeve.

References Cited in the file of this patent

UNITED STATES PATENTS

| 1,724,070 | Byrne et al. | Aug. 13, 1929 |
| 2,541,775 | Miller | Feb. 13, 1951 |
| 2,676,843 | Parsons et al. | Apr. 27, 1954 |

FOREIGN PATENTS

| 1,054,610 | France | Oct. 7, 1953 |